(12) United States Patent
Callard et al.

(10) Patent No.: US 10,015,285 B2
(45) Date of Patent: Jul. 3, 2018

(54) SYSTEM AND METHOD FOR MULTI-STREAM COMPRESSION AND DECOMPRESSION

(71) Applicant: Huawei Technologies Co., Ltd., Shenzhen (CN)

(72) Inventors: Aaron James Callard, Ottawa (CA); Alex Stephenne, Stittsville (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 480 days.

(21) Appl. No.: 13/828,278

(22) Filed: Mar. 14, 2013

(65) Prior Publication Data

US 2014/0269774 A1    Sep. 18, 2014

(51) Int. Cl.
| | |
|---|---|
| H04L 29/06 | (2006.01) |
| H04N 21/222 | (2011.01) |
| H04N 21/2343 | (2011.01) |
| H04N 21/238 | (2011.01) |
| H04N 21/2665 | (2011.01) |
| H04L 12/743 | (2013.01) |
| H04L 12/723 | (2013.01) |

(52) U.S. Cl.
CPC ............ *H04L 69/04* (2013.01); *H04L 65/605* (2013.01); *H04N 21/222* (2013.01); *H04N 21/238* (2013.01); *H04N 21/2343* (2013.01); *H04N 21/2665* (2013.01); *H04L 45/50* (2013.01); *H04L 45/7453* (2013.01)

(58) Field of Classification Search
CPC .......... H04L 69/06; H04L 65/05; H04N 21/22
USPC .................................................. 370/477, 355
See application file for complete search history.

(56) References Cited

U.S. PATENT DOCUMENTS

| | | | |
|---|---|---|---|
| 6,249,532 B1* | 6/2001 | Yoshikawa et al. .......... 370/486 |
| 7,975,071 B2* | 7/2011 | Ramjee ............... H04L 67/2828 | 370/352 |
| 2002/0199185 A1* | 12/2002 | Kaminski ................ H04N 5/76 | 725/25 |
| 2003/0133461 A1* | 7/2003 | Ho et al. .................. 370/395.52 |

(Continued)

FOREIGN PATENT DOCUMENTS

| | | |
|---|---|---|
| CN | 101120592 A | 2/2008 |
| CN | 101615911 A | 12/2009 |

(Continued)

OTHER PUBLICATIONS

"Data Compression/Dictionary Compression," Wikibooks, http://en.wikibooks.org/wiki/Data_Compression/Dictionary_compression, downloaded Jun. 29, 2014, 13 pgs. "Lecture 5: Sources with Memory and the Lempel-Ziv Algorithm," 6.450 Principles of Digital Communications, Sep. 2002, 9 pgs.

(Continued)

*Primary Examiner* — Noel R Beharry
*Assistant Examiner* — Pamit Kaur
(74) *Attorney, Agent, or Firm* — Slater Matsil LLP

(57) ABSTRACT

A method for decompressing data includes receiving, by a network element, a first plurality of packets. Also, the method includes receiving, by the network element, a second plurality of packets. Additionally, the method includes decompressing the first plurality of packets by a first decompressor using a first compression scheme and decompressing the second plurality of packets by a second decompressor using a second compression scheme.

22 Claims, 10 Drawing Sheets

(56) References Cited

U.S. PATENT DOCUMENTS

| | | | |
|---|---|---|---|
| 2005/0090273 A1* | 4/2005 | Jin | H04L 12/1877 455/502 |
| 2007/0165604 A1* | 7/2007 | Mooney et al. | 370/352 |
| 2007/0230461 A1* | 10/2007 | Singh | H04L 29/06027 370/389 |
| 2009/0123081 A1* | 5/2009 | DeLuca | 382/234 |
| 2010/0157802 A1* | 6/2010 | Casey et al. | 370/235 |
| 2010/0215020 A1* | 8/2010 | Lee | H04L 1/1614 370/331 |
| 2013/0018932 A1* | 1/2013 | Bhaskar | H03M 7/3088 708/203 |
| 2013/0103655 A1* | 4/2013 | Fanghaenel | G06F 17/30336 707/693 |
| 2013/0170435 A1* | 7/2013 | Dinan | 370/328 |
| 2014/0006036 A1 | 1/2014 | Qi et al. | |
| 2014/0029622 A1* | 1/2014 | Bettink et al. | 370/394 |

FOREIGN PATENT DOCUMENTS

| | | |
|---|---|---|
| WO | 2011112316 A1 | 9/2011 |
| WO | 2012138819 A2 | 10/2012 |

OTHER PUBLICATIONS

Farinacci, et al., "RFC2784—Generic Routing Encapsulation (GRE)," The Internet Society, Mar. 2000, 8 pgs.

Irmak, U. et al., "Hierarchical Substring Caching for Efficient Content Distribution to Low-Bandwidth Clients," In Proc. or the 14th Int. World Wide Web Conference, May 2005, 11 pgs.

Reinhardt, A. et al., "Stream-oriented Lossless Packet Compression in Wireless Sensor Networks," 6th Annual IEEE Communications Society Conference on Sensor, Mesh and Ad Hoc Communications and Networks, (SECON 2009), Jun. 2009, 9 pgs.

Saha, S. et al., "CombiHeader: Minimizing the Number of Shim Headers in Redundancy Elimination Aystems," 2011 IEEE Conference on Computer Communications Workshops (INFOCOM WKSHPS), Apr. 2011, 6 pgs.

Saldana, J. et al., "Tunneling Compressed Multiplexed Traffic Flows (TCMTF)," Transport Area Working Group, Internet Draft, Mar. 2, 2012, 16 pgs.

Ziv, J. et al., "Compression of Individual Sequences via Variable-Rate Coding," IEEE Transactions on Information Theory, vol. 24, No. 5, Sep. 1978, pp. 530-536.

PCT International Search Report and Written Opinion, International Application No. PCT/CN2014/073407, Applicant: Huawei Technologies Co., Ltd., dated Jun. 3, 2014, 14 pages.

* cited by examiner

US 10,015,285 B2

SYSTEM AND METHOD FOR MULTI-STREAM COMPRESSION AND DECOMPRESSION

TECHNICAL FIELD

The present invention relates generally to a system and method for communications, and, in particular, to a system and method for multi-stream compression.

BACKGROUND

The effective throughput of a network can be improved, for example, using data compression. Data compression involves encoding information using fewer bits than the original compression. Data may be compressed, transmitted, and then decompressed. Compression reduces data storage space and transmission capacity, with a tradeoff of increased computation.

Data compression may be lossy or lossless. In lossless data compression, statistical redundancy is identified and eliminated, and no information is lost. Examples of lossless compression include Lempel-Ziv (LZ) compression, DEFLATE compression, LZ-Renau compression, Huffman coding, compression based on probabilistic models such as prediction by partial matching, grammar-based coding, and arithmetic coding. In lossy compression, marginally important information is identified and removed. Lossy data compression schemes are based on how people perceive the data in question. For example, the human eye is more sensitive to subtle variations in luminance than the variations in color. Examples of lossy compression include JPEG compression, MPEG compression, and Mp3 compression. Different coding methods are more efficient in compressing different data types. For example, JPEG compression is best used to compress images, MPEG compression is best used to compress video, MP3 compression is best used to compress audio, a lossless compression scheme is best used to compress a text file, and no compression is best for an already compressed file.

SUMMARY OF THE INVENTION

In accordance with an embodiment, a method for decompressing data includes receiving, by a network element, a first plurality of packets. Also, the method includes receiving, by the network element, a second plurality of packets. Additionally, the method includes decompressing the first plurality of packets by a first decompressor using a first compression scheme and decompressing the second plurality of packets by a second decompressor using a second compression scheme.

In accordance with another embodiment, a method for compressing data includes determining that a first packet is in a first plurality of packets and determining that a second packet is in a second plurality of packets. Also, the method includes compressing, by a network element, the first plurality of packets by a first compressor using a first compression scheme, and compressing, by the network element, a second plurality of plackets by a second compressor using a second compression scheme. Additionally, the method includes transmitting the first plurality of packets and transmitting the second plurality of packets.

In accordance with yet another embodiment, a network element for decompressing data includes a receiver configured to receive a first plurality of packets, route the first plurality of packets to a first decompressor, receive a second plurality of packets, and route the second plurality of packets to a second decompressor. Also, the network element includes the first decompressor, configured to decompress the first plurality of packets using a first decompression scheme, and the second decompressor, configured to decompress the second plurality of packets using a second decompression scheme.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
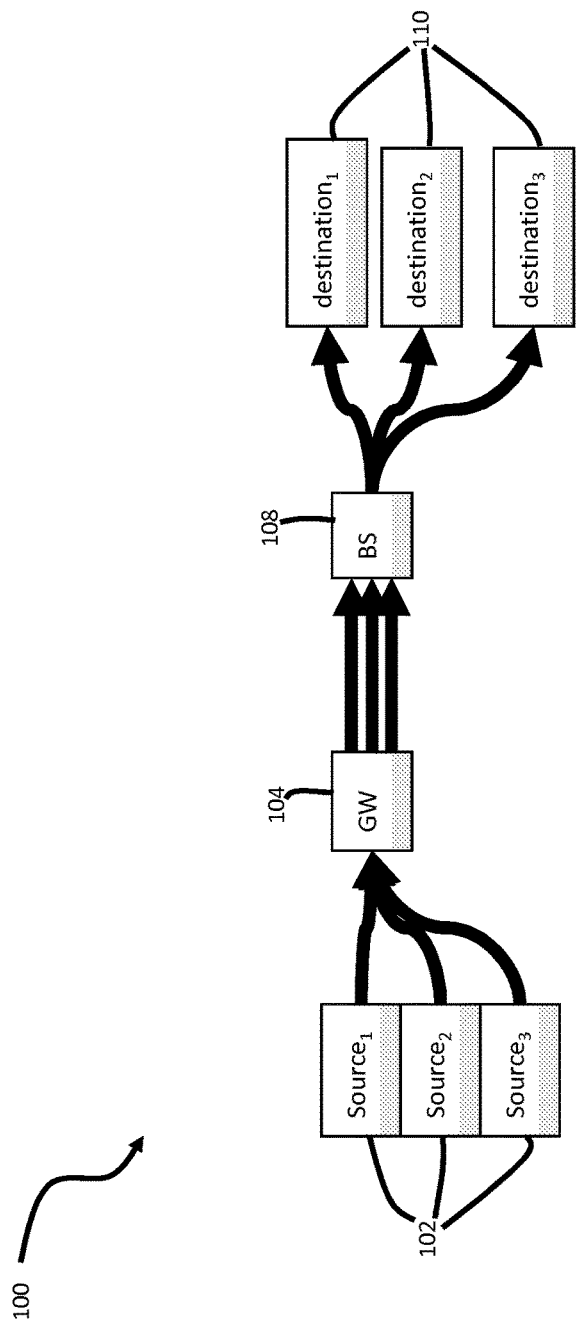
FIG. 1 illustrates an embodiment system for multi-stream compression and decompression.

In an example, multiple data streams are compressed separately, where each data stream is compressed, transmitted, and decompressed. Alternatively, multiple streams may be merged into one transmission stream and compressed together prior to transmission. The multiple streams are then decompressed together after transmission. FIG. 1 illustrates embodiment system 100 for multi-stream compression, transmission, and decompression. Initially, sources 102 produce data. FIG. 1 illustrates three sources for clarity, but more or fewer sources may be present. Next, gateway 104 compresses the data. In an example, gateway 104 contains multiple compressors. After that, the compressed data is transmitted. Then, the compressed data received by base station 108. In an example, base station 108 contains multiple decompressors. Finally, the decompressed data is routed to destinations 110. Hence, multiple streams are transmitted through a single link. Three destinations are pictured, but there may be more or fewer destinations. In an example, there are more destinations than sources. Alternatively, there may be fewer destinations than sources.

Figure 2:
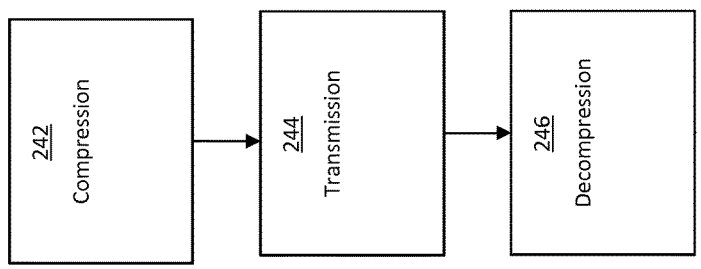
FIG. 2 illustrates a flowchart of an embodiment method of multi-stream compression and decompression.

FIG. 2 illustrates a flowchart of a method of compressing, transmitting, and decompressing data. Initially, in step 242, data compression is performed on multiple streams. Then, in step 244, the multiple data streams are transmitted in the same link. Finally, in step 246, the multiple streams are decompressed. Data compression and decompression constitute a compression scheme.

Figure 3:
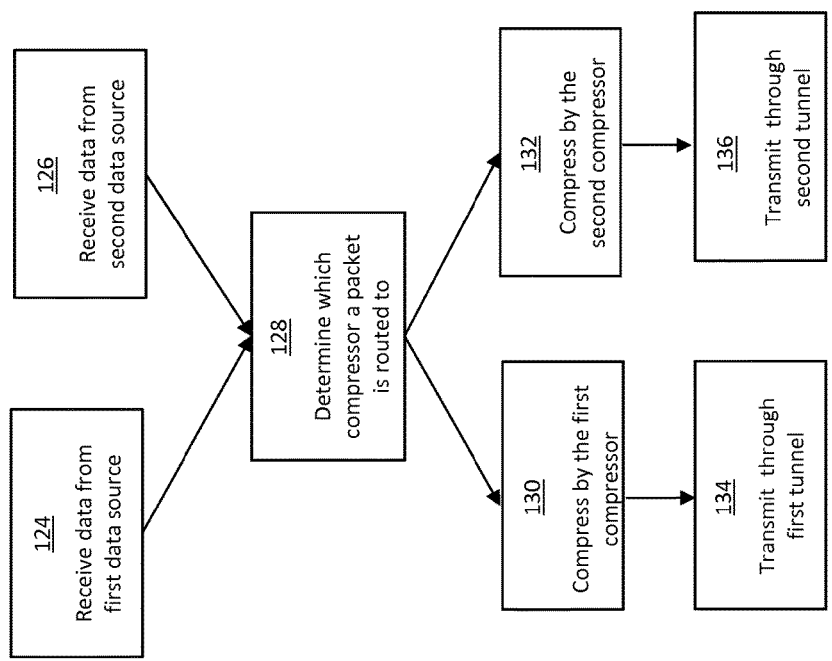
FIG. 3 illustrates a flowchart of an embodiment method of multi-stream compression.

Adaptive tunneling is a method of compressing, transmitting, and decompressing multiple streams of data. In adaptive tunneling, data from multiple data streams is directed to multiple tunnels, and a different compression scheme is used for each tunnel, where the tunnels are first in first out (FIFO) tunnels. FIG. 3 illustrates a flowchart of a method of compressing multiple data streams for adaptive tunneling. Initially, data is received from a first data source 124 and a second data source 126. Two data sources are illustrated for clarity, but a greater number of data sources may be used. Then, in step 128, the data packets are routed to the appropriate compressor. In one example, the data type of the packet determines which compressor it is routed to. The data type may be determined using deep packet inspection. For example, one compressor may compress an audio file, another compressor may compress HTML, and a yet another compressor may compress movies. This can be further broken down by subject matter. For Example, one compressor may be devoted to English language blogs, while another may be for French language wiki entries. In practice which compressor is used is determined based on the content in the packet. This may either be based on header information (IP/TCP/UDP determining if this packet from Google, Wikipedia, or belongs to a particular stream), or the actual data content of the packet. In an example, sequences, for example sequences of bytes may be used. For example, finding a string containing 'that' could indicate that this packet is an English text, and that packet would be forwarded to the English language compressor. In another example, data packets are routed based on the IP address of their user, their TCP or UDP port, or another mechanism, such as by Ethernet address or SONET. Alternatively, a packet may be compressed by each compressor, and the packet is ultimately routed to the compressor that compressed the packet the most. In one example, some packets may be directly routed to a tunnel without compression, for example if the data packets have already been compressed.

Next, the data is compressed by compressor 130 and compressor 132. Two compressors are illustrated for clarity, but a greater number of compressors may be used. There may be more compressors than data streams, the same number of compressors as data streams, or fewer compressors than data streams. Finally, in step 134, data packets compressed by the first compressor are transmitted in a first tunnel, and in step 136, data packets compressed by the second compressor are transmitted in a second tunnel. Additionally, there may be a tunnel for uncompressed data, which, for example, transmits data that was previously compressed. In an example, the mapping of the tunnels is semi-static, and by default based on an IP or port number. The tunnels may be layer 2 tunneling protocol (L2TP) over IP, generic routing encapsulation (GRE) over IP, or multi-protocol label switching (MPLS) architecture. In tunneling, packets are encapsulated into some form of lower layer payload and transmitted to another node, where they are converted to their native form and transmitted. A tunnel could use a lossless protocol, such as TCP, to ensure that the data arrives without loss or a change in ordering. Alternatively, a lossy protocol, such as UDP, may be used, which has less delay, but the compression layer should account for possible losses. The compression streams are continuous and non-branching in adaptive tunneling.

Figure 4:
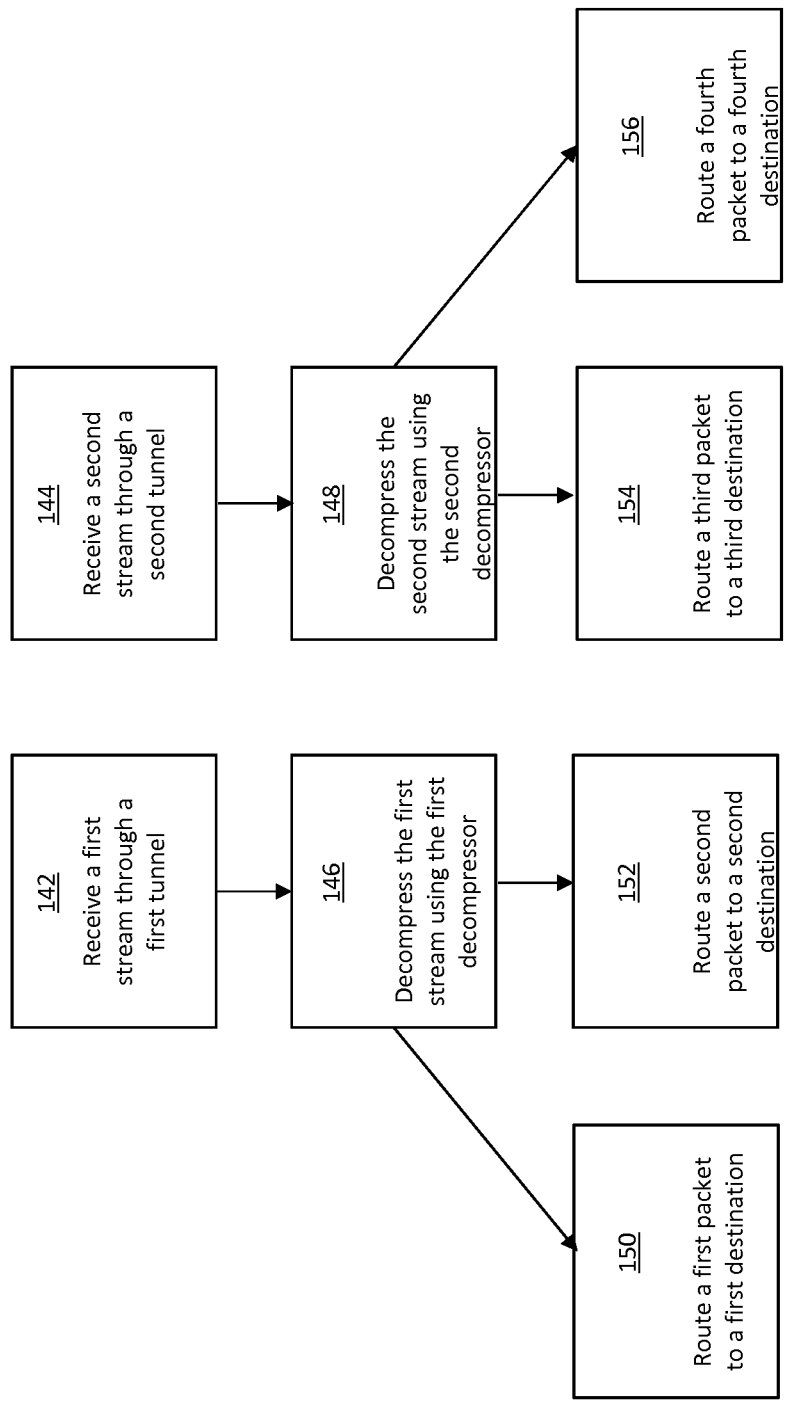
FIG. 4 illustrates a flowchart of an embodiment method of multi-stream decompression.

FIG. 4 illustrates a flowchart of an embodiment method of decompressing data for adaptive tunneling. Initially, in step 142, a first stream is received through a first tunnel, and in step 144 a second stream is received through a second tunnel. Two tunnels are illustrated, but more tunnels may be used. Then in step 146, a first decompressor decompresses the first stream, and in step 148 a second decompressor decompresses a second stream. In other examples, there may be additional decompressors. Additionally, one tunnel may not be decompressed if it was not compressed by the compressor. Finally, in steps 150, 152, 154, and 156 the packets are routed to their final destinations. In other examples, there may be more or fewer destinations.

Another way to compress multiple data streams together is to use a with respect to (wrt) field. A header is created, which contains a wrt field that explicitly informs the decompressor where this packet falls in the compressed data stream. The wrt field indicates what the packet is compressed with respect to. A protocol layer is generated for separating streams. The wrt field may be part of a compression layer. Streams may branch, and new packet streams may be created on the fly.

Figure 5:
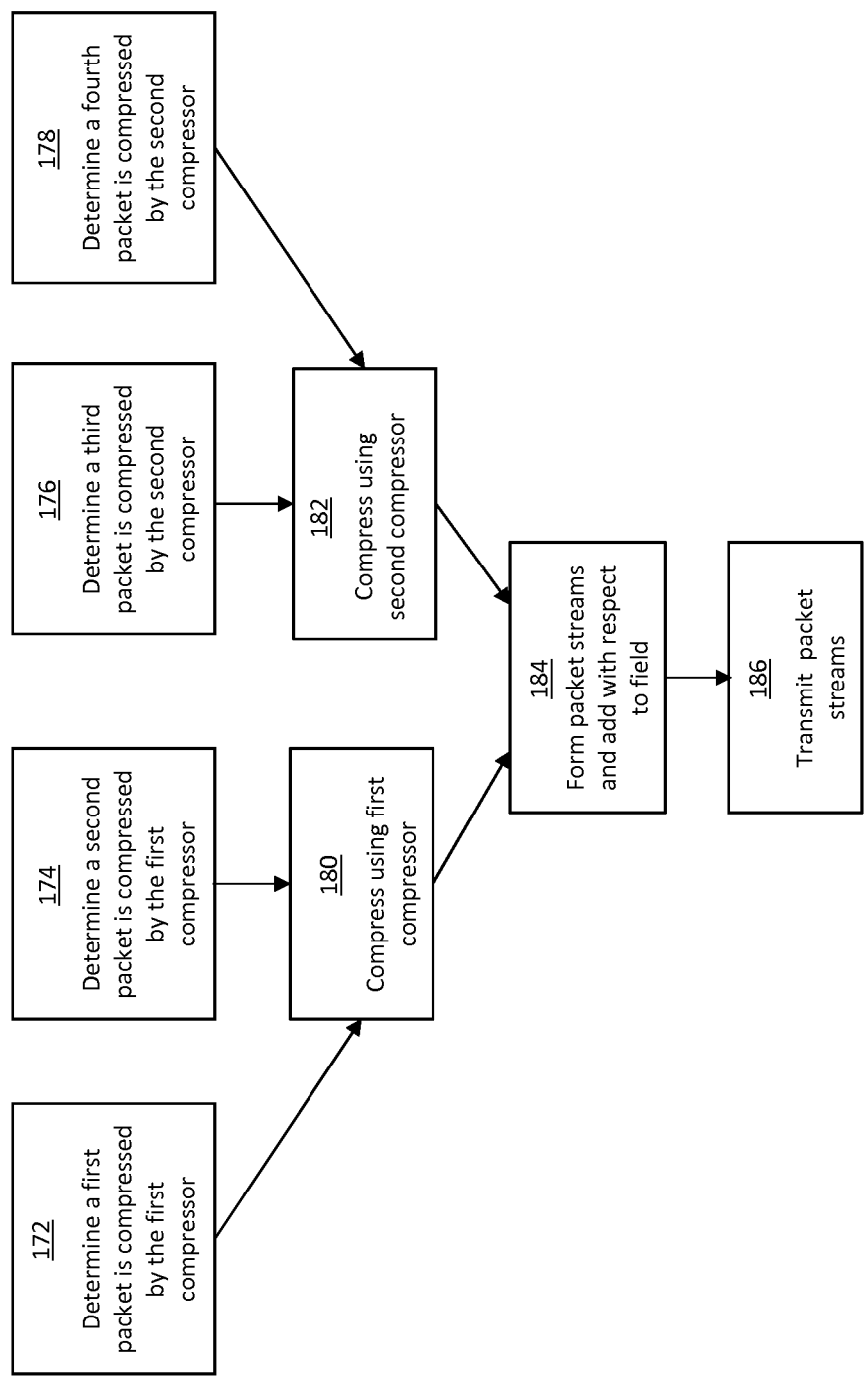
FIG. 5 illustrates a flowchart of another embodiment method of multi-stream compression.

FIG. 5 illustrates a flowchart for an embodiment method of multi-stream compression using wrt fields. Initially, in steps 172, 174, 176, and 178, the data packets are compressed by which compressor. In one example, the data type of the packet determines which compressor it is routed to. The data type may be determined using deep packet inspection. For example, one compressor may compress an audio file, another compressor may compress HTML, and a yet another compressor may compress movies. This can be further broken down by subject matter. For Example, one compressor may be devoted to English language blogs, while another may be for French language wiki entries. In practice which compressor is used is determined based on the content in the packet. This may either be based on header information (IP/TCP/UDP determining if this packet from Google, Wikipedia, or belongs to a particular stream), or the actual data content of the packet. In an example, sequences, for example sequences of words in a text, may be used. In an example, sequences, for example sequences of words in a text, may be used. In another example, data packets are routed based on the IP address of their user, their TCP or UDP port, or another mechanism, such as by Ethernet address or SONET. Alternatively, a packet may be compressed by each compressor, and the packet is ultimately routed to the compressor that compressed the packet the most. In one example, some packets may be directly routed to a tunnel without compression, for example if the data packets have already been compressed. Next, in step 180, some data packets are compressed by a first compressor in step 180, and other data packets are compressed in step 182 using a second compressor. Alternatively, additional compressors may be used, or some data packets may not be compressed. Then, in step 184, the compressed data packets form streams, and a wrt field is added to the data packets. Finally, in step 186, the data packets are transmitted. A single transmission stream may contain data in different compression streams. Also, data packets in the same compression stream may be in different transmission streams.

Figure 6:
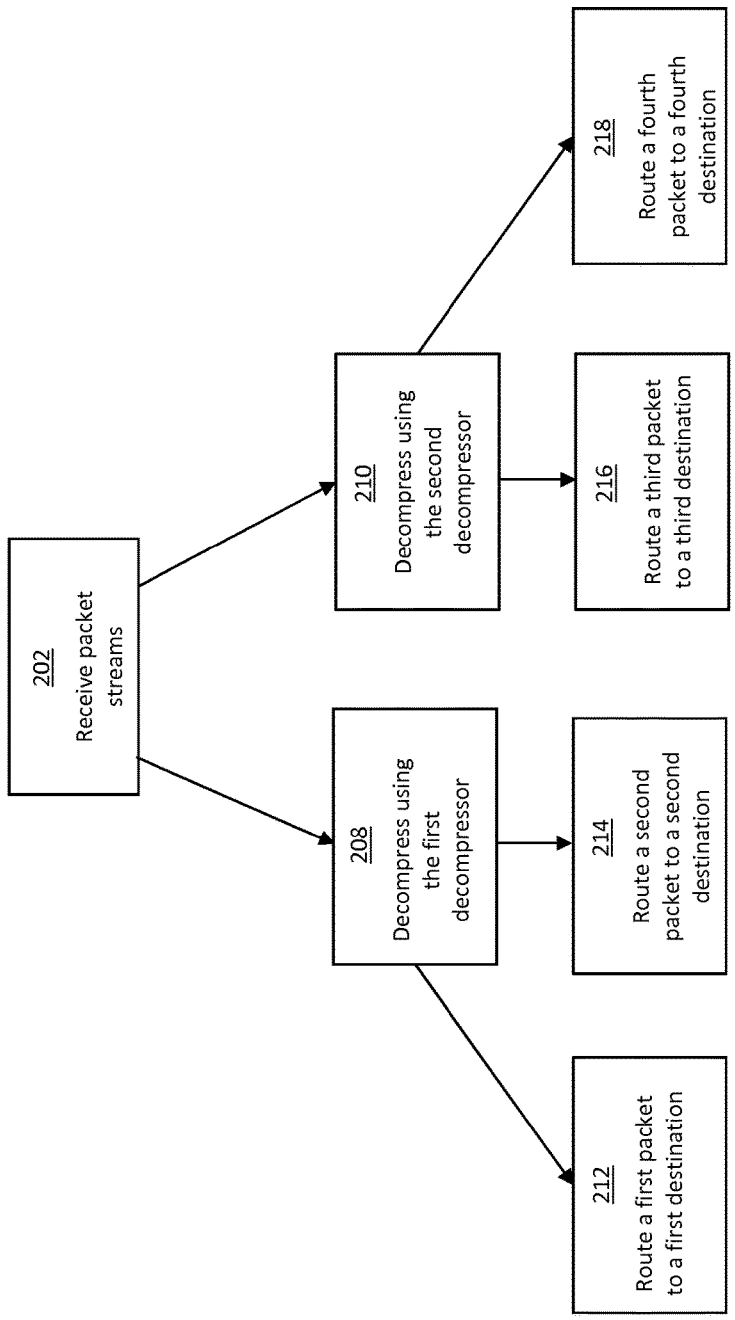
FIG. 6 illustrates a flowchart of another embodiment method of multi-stream decompression.

FIG. 6 illustrates a flowchart for an embodiment method of multi-stream decompression using wrt fields. Initially, in step 202, streams of packets are received. Using a wrt field, packets are routed to the appropriate decompressor. The data packets in a single transmission stream may be routed to different decompressors. Also, data packets from different transmission streams may be routed to the same decompressor. If a wrt field cannot be understood, a protocol initiates a fill in the gaps request. The decompressor sends a message indicating the wrt field that it could not be correctly decompressed, possibly indicating the problem, for instance that the field it refers to is not accessible, packet errors occurred, or that the cyclic redundancy check (crc) did not check. The compressor then replies with information to recover from this loss. The specifics of what this message contains are dependent on the compression scheme used. The message could be an uncompressed version of the related packet that the wrt field was attached too or one of several lower overhead options. For instance, undecodeable metadata could be clarified explicitly. For example, metadata x=uncompressed w, via difference based encoding for a message which indicates what changes are necessary (i.e., replace data 100-2000 with xyz). In step 208, packets are decompressed using a first compressor, while in step 210, packets are decompressed using a second decompressor. Alternatively, additional decompressors may be used. Finally, in steps 212, 214, 216, and 218, the decompressed packets are routed to their destination. More or fewer destinations may be used.

It should be noted that a compressor/decompressor may include several compression steps and that the wrt field may be applied independently or jointly for the different stages. For example DEFLATE consists of two stages of compression, one consisting of adding backwards references and another applying statistical compression. These two levels can be treated separately with possibly different wrt fields.

In one embodiment, the wrt field indicates one of transmission several transmission streams, which may include upload streams, download streams, and TCP/IP streams. When a new packet goes through the compressor, a new compression stream is created, consisting of the previous compression stream plus the new packet. The reference in the wrt field may be a hash value, for example a hash of the compression stream, a random number, a label and a state, such as download stream state x, or a label and a distance, for example 200 packets from the beginning of the compression stream or from the last acknowledgement. In an example, the wrt field is highly predictable. For instance, a compression stream may reference the same transmission stream that this transmission flow previously referenced. Such a default may be predetermined. Alternatively, the default may be configured with minimal signaling to indicate a confirmation. Using a default can thus reduce the size. Standard header compression schemes like those used for TCP/IP compression can be used. Using a default can thus reduce the size. Standard header compression schemes like those used for TCP/IP compression can be used.

In another embodiment, the wrt field refers to a hash of a dictionary. As the dictionary is updated, an agreed upon HASH of that dictionary is stored, which can be referred to later. In an example, the dictionary is Hoffman coded. A header field may indicate when dictionaries will be stored or overwritten. In an embodiment, a wrt field does not affect references occurring before a particular point (i.e., the beginning of a packet/flow). In another embodiment, it may be included in the middle of a block if the data types change.

Figure 7:
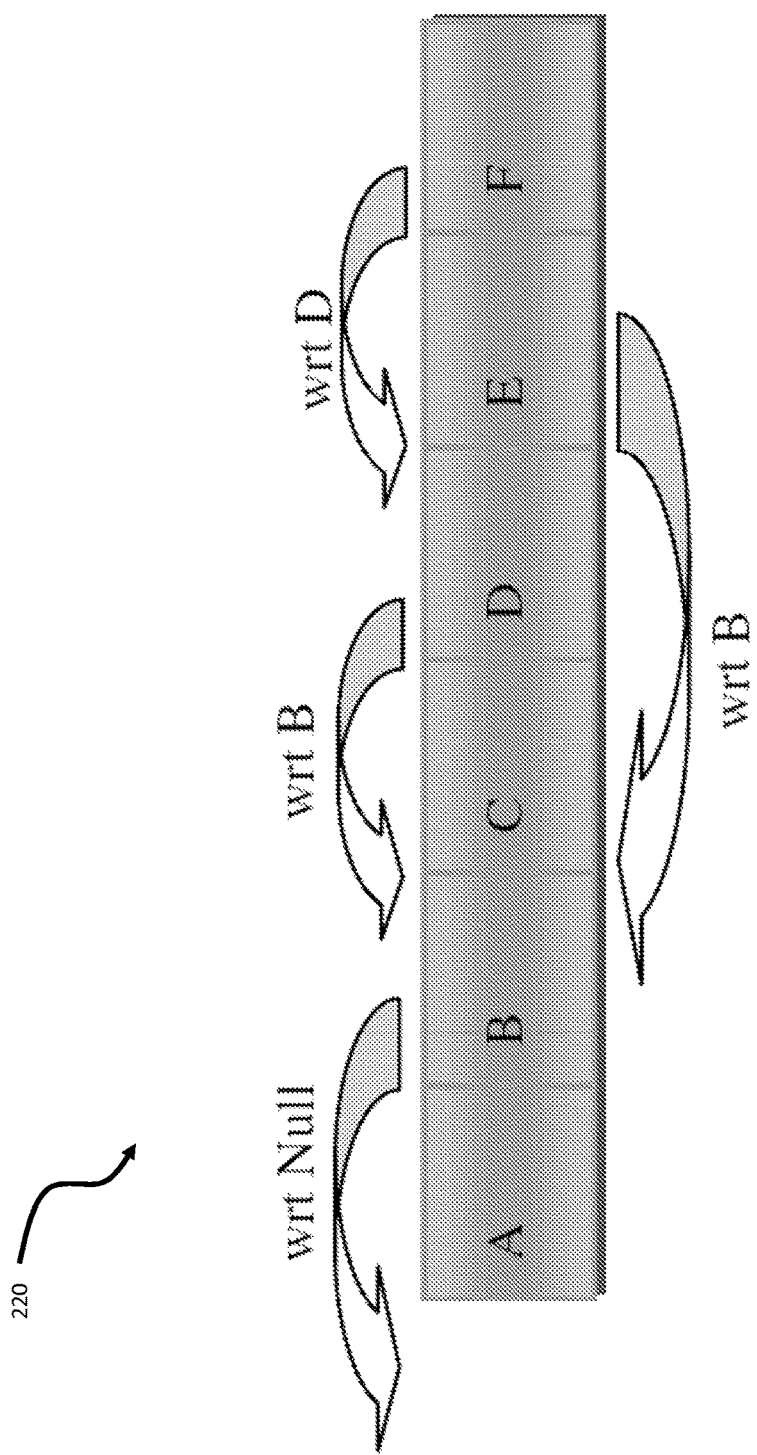
FIG. 7 illustrates a schematic of an embodiment data stream.

In an example, packet losses occur in data transmission, but the compressor is aware of the losses with a delay X. The wrt field refers to a stream of packets X packets back. To implement this, the location in the stream of a few values may be stored, along with the stream itself. In another example, no packet losses occur, but the transmission stream contains unlike elements. Thus, the wrt field organizes packets into like elements. The wrt field may build up combinations of like packets. FIG. 7 illustrates data steam 220 using a wrt field. In FIG. 5, the transmission stream includes data packets A, B, C, D, E, and F. Packet F has a wrt field referring to packet D, which has a wrt field referring to packet B, producing a compression stream ADF. Packet E has a wrt field referring to packet B, producing a compression stream BE. FIG. 5 illustrates a single transmission stream. However, a wrt field may refer to previous packets in its own transmission stream or in other transmission streams that the decompressor would have access to, such as an upload stream, a download stream, or a different tunnel.

In one embodiment, hashing and storing is performed using a small chunk size. Only a fraction of the chunks may be stored. The similarity between different streams can be detected. Then, the wrt field is set to the chunk with the most similarity, considering the possibility of errors.

A preferred size of the wrt field is a function of how much gain can be achieved and what the wrt field does. In an example, the size is dynamic, depending on the feature used. For example, the actual number of bits used for each wrt field is decided based on expected parameters. It may be dynamically determined. Alternatively, the size of the wrt field is fixed. If there is no compression, there may not be a sub-field. In another example, the wrt indicates a lack of compression. When there is a new packet flow, the sub-field may indicate the compression type, for example gzip or 7zip. For new packet flows, the type of compression applied to the packet flow is decided. The number of options or the meaning of the data can be set semi-statically or hardwired. Also for a new packet flow, a sub-field may include the packet flow name, which may be generated implicitly, by some agreed-upon labeling method (i.e. a hash of the packet, or a simple counting).

There may be a continuation of the previous packet flow. X bits may indicate the packet flow options. For example, a name may be global, or it may be dependent on variables within the packet itself, for example combined with an IP address. A subframe may indicate a fixed stream, with X bits explicitly indicating a packet flow name, and optionally with Y bits representing the location within the stream, which may be a hash value, a relative value or an absolute value. Also, a sub-field may indicate that a new flow is generated. This sub-field indicates if the new packet steam is referenceable, for example if the hash of the old stream and the present packet are valid hashes. In another example, the sub-field is the hash of the packet flow, where X bits represent the hash of the previously used hash. Alternatively, the sub-field could be a fixed predefined packet stream, which enables dictionaries or compression schemes to be applied to traffic.

The wrt field may indicate a state of a flow or a cyclic redundancy check (CRC). A sub-field may be responsible for verifying the state of the packet stream. For example, it may indicate that there are no missing or reordered packets. This may be the CRC of the uncompressed data, the XOR of all the remaining bits of the hash values, or a combination of both. Lower layers, such as port numbers, can be reused for a wrt field.

In an example, there are multiple wrt fields, which subsequent metadata distinguishes between. For example, the wrt field may describe two compression streams, and the metadata includes an additional bit to distinguish between the two streams. Alternatively, there could be a switch wrt field message that indicates a change in the wrt field within the data packet. The switch may be differential, for example it could refer back to the wrt field used previously. Alternatively, the switch may be absolute.

In an example, at a regular interval, for example every ms, the decompressor acknowledges the packets that it has received and assigns them an order. These received packets may be decompressed in several orders. Once an order is chosen, the decompressor acknowledges, to the compressor, that the packets were received. The decompressor also indicates, using a decompression state, the order in which the packets were processed. The new packets, combined with the previous state, results in a unique state value. The state value may be a hash of the packet IDs and the previous state hash, or a function of an acknowledgment packet, such as an index number. The compressor uses the decompressor state in encoding additional packets. Also, the compressor prepends the value to packets to indicate that the decompressor should use this state for decompression of these packets. If any packets come in outside the acknowledgements, they are still processed, but they are not used in compression.

Compression may be performed at the object level. The compression streams may branch and merge, but at the object level rather than at the packet level. When a compression stream branches, inputs, an initial state, and a label inform the decompressor that a new compression stream branch is to be generated based on the state, which will be referred to by the label. If available, the size of the object (i.e. this stream) can also be sent. If the label was previously used, it will be overwritten. The acknowledgment of the received packets will then contain the new label. When compression streams merge, inputs of a first state and a second state inform the decompressor to create a new state, which is a combination of the first state and the second state. The first state and the second state must have previously branched. The response is the new state, or an error message. This new state could be as simple as the first stream followed by the second stream.

Figure 8:
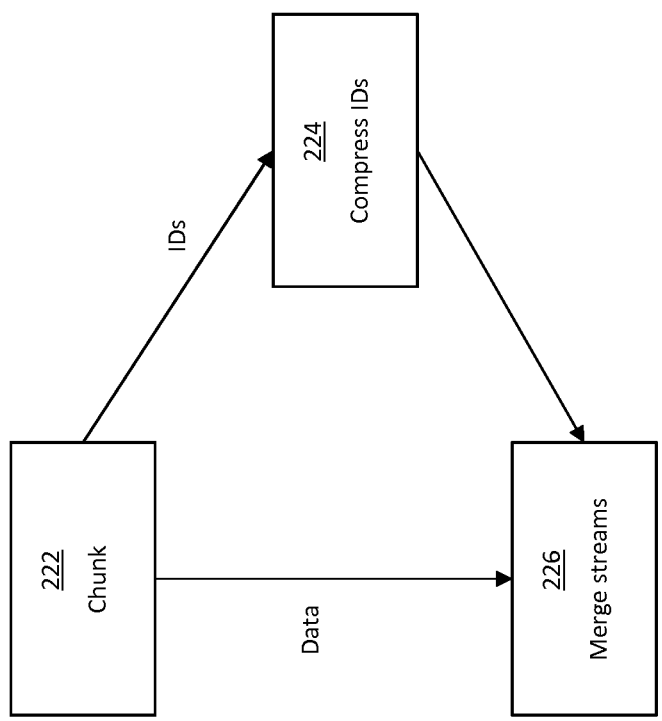
FIG. 8 illustrates a flowchart of an embodiment method of compression for redundancy elimination.

Two stage redundancy elimination (RE) uses compression to improve performance. FIG. 8 illustrates a flowchart of a method of compression for RE. In RE, parameters are automatically tuned. Initially, in step 222, chunking is performed, and a source stream is broken into a data stream and a stream of IDs. In an example, the IDs. Also, the ID compression unit compressed using standard compression techniques. The ID compression unit sends decodable IDs and detects and recovers from any collisions. Additionally, the ID compression unit determines if the decompressor has received ID. Next, in step 224, the IDs are compressed by an ID compression unit. In an example, standard compression techniques are used. In an example, location correlations between different IDs are used. The ID is taken in the first time it passes through the communications system. Compression may be performed by creating an alphabet of the IDs and performing compression on them. The alphabet may be large, for example over a million letters for 32 bit IDs. The output is typically either in the form of a letter of an alphabet or metadata. Finally, in step 226, the data stream and the stream of the compressed IDs are merged. In an embodiment, the IDs are not actually being transmitted, but are calculated from the transmitted data. Processing may be performed to intercept the outputs from the ID compression scheme corresponding to new IDs passing through the compressor. The IDs will be regenerated at the receiver side, using a hashing function. The requirements of the second stage are effectively reduced by the average chunk size of the first step.

Figure 9:
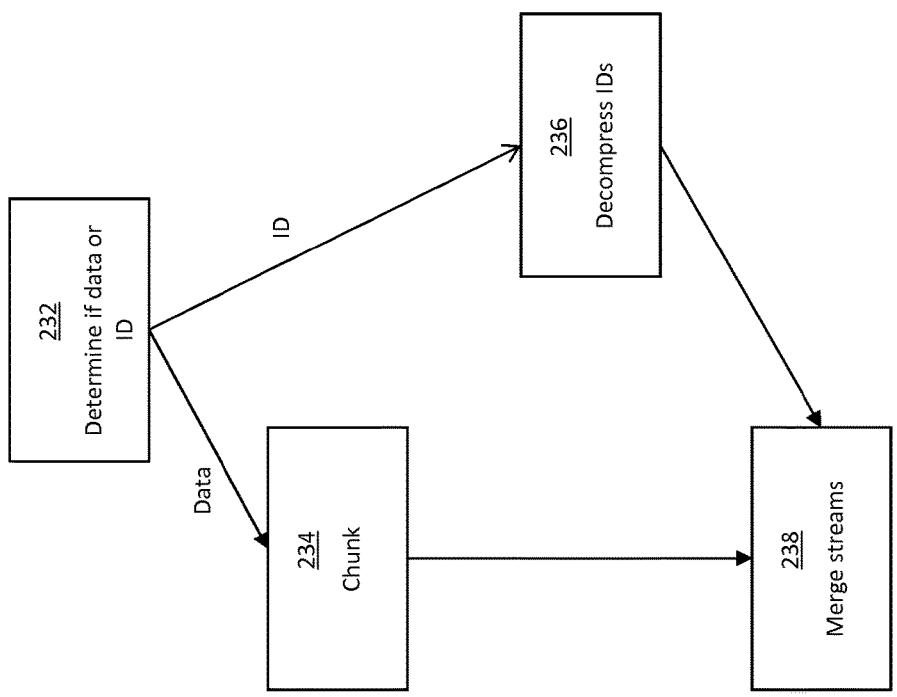
FIG. 9 illustrates a flowchart of any embodiment method of decompression for redundancy elimination.

FIG. 9 illustrates a flowchart of a method of decompression for RE. Initially data and IDs are separated. The data is chunked in step 234, and the IDs are generated in step 236. For example, the chunks are hashed, and the hash is converted to an ID, and passed to the decompressor for later uses. The compressed metastream is passed to the decompressor. The output are IDs that are understandable by the RE algorithm. The ID stream is converted to data, which is passed to higher layers. Finally, the data and the IDs are merged in step 238.

In one example, the order in which chunks arrive is taken into account when signaling their transition. If an order has occurred previously, only a first portion of bits, not all the bits, are transmitted. In an example, two or three bits are transmitted. In another example, metadata is compressed using standard software. For examples, back references, may indicate to go back 1000 bits and use the next 80 bits. In an example, TCP is used. A protocol that detects and resolves missed back references may be used. Back references may either refer to bits in the same packet, or from some agreed upon point, such as the last packet where an acknowledge was received under TCP, or with an acknowledge from UDP without retransmission. Alternatively, a dictionary approach is used. The dictionary can be adaptive or static, and may use a hash of the dictionary. The compressor can choose which dictionary the dictionary comes from. Compression ratios greater than 10:1 may be found for a chunk size of 32 bytes. Alternatively, LZP may be used.

Figure 10:
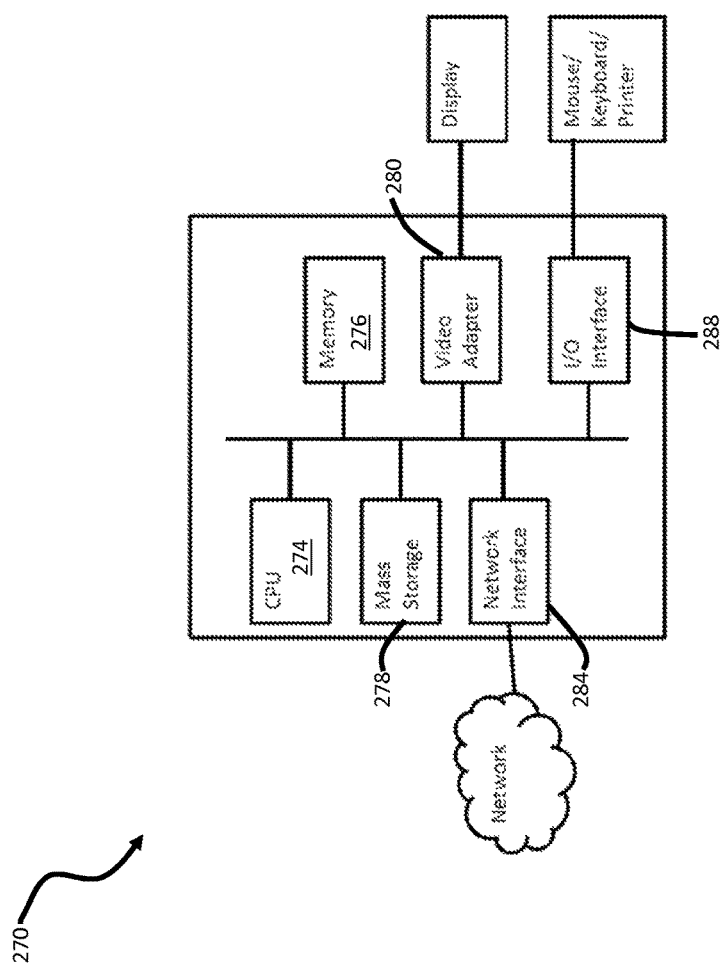
FIG. 10 illustrates a schematic diagram of an embodiment of a general-purpose computer system.

FIG. 10 illustrates a block diagram of processing system 270 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, tec. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Advantages of an embodiment include good compression rates without added loss. Another advantage of an embodiment is good results with small packet or stream sizes or with a lossy transmission medium. Other advantages of an embodiment include a method that is simple and expandable, that scales easily to large sliding windows, and that reuses well tested and designed algorithms to find matches on larger window sizes. An advantage of an embodiment is good performance at small chunk size. In an embodiment, errors in packet ordering may be detected. Also, in an embodiment, the impact of packet reordering or loss on compression and decompression are minimized. In another example, the overall performance is improved by allowing a single compression scheme to access the data from more than one stream. Advantages of another embodiment include improved performance by moving like data closer together. Also, decoding errors may be detected by an embodiment. In an example, different streams can be efficiently mixed. In another embodiment, the total number of independent streams is decreased, leading to a reduction in the total memory requirement.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for decompressing data, the method comprising:

receiving, by a network element, a first compressed data stream;

receiving, by the network element, a second compressed data stream;

decompressing, by the network element, the first compressed data stream using a first compression scheme, thereby obtaining a first data stream;

identifying a with respect to (wrt) field in the second compressed data stream, the wrt field indicating that a second data stream was compressed with respect to the first data stream, the second data stream being separate and distinct data from the first compressed data stream; and decompressing the second compressed data stream by replacing a metadata in the second compressed data stream with a string of consecutive symbols in the first data stream, thereby obtaining the second data stream.

2. The method of claim 1, wherein receiving the first compressed data stream comprises receiving the first compressed data stream through a first tunnel, and wherein receiving the second compressed data stream comprises receiving the second compressed data stream through a second tunnel.

3. The method of claim 2, wherein the first tunnel comprises a Layer 2 Tunneling Protocol over IP tunnel.

4. The method of claim 2, wherein the first tunnel comprises a Multiprotocol Label Switching Architecture tunnel.

5. A method for compressing data, the method comprising:

compressing a first data stream by replacing a first string of consecutive symbols in the first data stream with a metadata associated with the first string of consecutive symbols, thereby obtaining a first compressed data stream;

compressing a second data stream with respect to the first data stream, thereby obtaining a second compressed data stream, the second data stream being separate and distinct data from the first compressed data stream, wherein compressing the second data stream with respect to the first data stream comprises determining that a second string of consecutive symbols in the second data stream matches the first string of consecutive symbols in the first data stream, embedding a with respect to (wrt) field in the second compressed data stream, the wrt field indicating that the second data stream was compressed with respect to the first data stream, replacing the second string of consecutive symbols in the second data stream with the metadata associated with the first string of consecutive symbols in the first data stream;

transmitting, by a network element, the first compressed data stream through a first tunnel; and transmitting, by the network element, the second compressed data stream through a second tunnel.

6. The method of claim 5, wherein the first compressed data stream is transmitted to a different end user than the second compressed data stream.

7. The method of claim 5, wherein the first compressed data stream carries at least some media content that is excluded from the second compressed data stream, or vice versa.

8. The method of claim 5, wherein the first tunnel is different than the second tunnel.

9. A network element comprising:
a processor; and
a non-transitory computer readable storage medium storing programming for execution by the processor, the programming including instructions to:
compress a first data stream by replacing a first string of consecutive symbols in the first data stream with a metadata associated with the first string of consecutive symbols, thereby obtaining a first compressed data stream;
compress a second data stream with respect to the first data stream, thereby obtaining a second compressed data stream, the second data stream being separate and distinct data from the first compressed data stream, wherein compressing the second data stream with respect to the first data stream comprises determining that a second string of consecutive symbols in the second data stream matches the first string of consecutive symbols in the first data stream, embedding a with respect to (wrt) field in the second compressed data stream, the wrt field indicating that the second data stream was compressed with respect to the first data stream, replacing the second string of consecutive symbols in the second data stream with the metadata associated with the first string of consecutive symbols in the first data stream;
transmit the first compressed data stream through a first tunnel; and
transmit the second compressed data stream through a second tunnel.

10. The network element of claim 9, wherein the first compressed data stream is transmitted to a different end user than the second compressed data stream.

11. The network element of claim 9, wherein the first compressed data stream carries at least some media content that is excluded from the second compressed data stream, or vice versa.

12. The network element of claim 9, wherein the first tunnel is different than the second tunnel.

13. A network element comprising:
a processor; and
a non-transitory computer readable storage medium storing programming for execution by the processor, the programming including instructions to:
receive a first compressed data stream;
receive a second compressed data stream;
decompress the first compressed data stream using a first compression scheme, thereby obtaining a first data stream;
identify a with respect to (wrt) field in the second compressed data stream, the wrt field indicating that a second data stream was compressed with respect to the first data stream, the second data stream being separate and distinct data from the first compressed data stream; and
decompress the second compressed data stream by replacing a metadata in the second compressed data stream with a string of consecutive symbols in the first data stream, thereby obtaining the second data stream.

14. The network element of claim 13, wherein the first compressed data stream is received through a different tunnel than the second compressed data stream.

15. The network element of claim 14, wherein the first compressed data stream is received via a Layer 2 Tunneling Protocol over IP tunnel.

16. The network element of claim 14, wherein the first compressed data stream is through a Multiprotocol Label Switching Architecture tunnel.

17. A method comprising:
receiving a data stream at a network element;
compressing the data stream to remove redundancy from the data stream, thereby generating a first compressed data stream that includes metadata and remaining uncompressed data;
compressing the metadata by replacing replicated metadata in the first compressed data stream with one or more compression symbols to remove-redundancy from the metadata, thereby generating a second compressed data stream that includes compressed metadata, remaining uncompressed metadata, and the remaining uncompressed data; and
transmitting the second compressed data stream over a tunnel.

18. The method of claim 17, wherein the metadata comprises a hash function of replicated data that was replaced by the metadata upon generating the first compressed data stream.

19. The method of claim 17, wherein at least one of the one or more compression symbols comprises a hash function of the replicated metadata that was replaced by the compressed metadata upon generating the second compressed data stream.

20. A method comprising:
receiving a first compressed data stream at a network element, the first compressed data stream including compressed metadata, uncompressed metadata, and uncompressed data;
decompressing the compressed metadata in the first compressed data stream by replacing one or more compression symbols in the compressed metadata with replicated metadata and merging the resulting decompressed metadata with the uncompressed metadata, thereby generating a second compressed data stream that includes metadata and the uncompressed data; and
decompressing the metadata in the second compressed data stream and merging the resulting decompressed data with the uncompressed data, thereby generating a data stream.

21. The method of claim 20, wherein the metadata comprises a hash function of replicated data.

22. The method of claim 20, wherein at least one of the one or more compression symbols comprises a hash function of the replicated metadata.

* * * * *